June 16, 1936.  J. BROADLEY  2,044,052
SWIVEL HOSE COUPLING
Filed Sept. 21, 1935
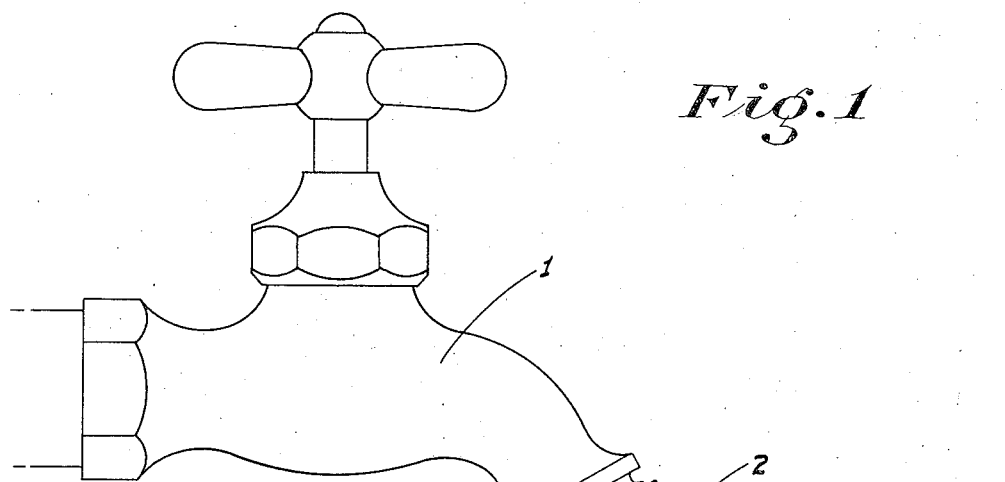
*Fig.1*
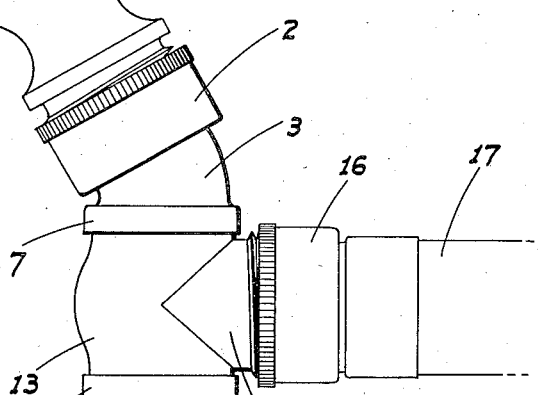
*Fig.2*
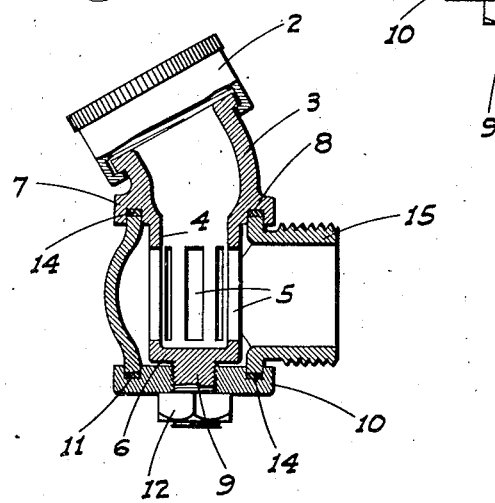
INVENTOR
Jos. Broadley
BY
ATTORNEY Patented June 16, 1936

2,044,052

UNITED STATES PATENT OFFICE 2,044,052

SWIVEL HOSE COUPLING

Joseph Broadley, Fair Oaks, Calif.

Application September 21, 1935, Serial No. 41,572

2 Claims. (Cl. 285—9)

This invention relates generally to a hose coupling and is directed in particular to a swivel hose coupling especially adapted for use in connection with a garden hose, although the coupling may be used in connection with any type of hose where the swivel movement would be desirable.

The principal object of my invention is to provide a swivel coupling for connection between a water outlet faucet such as commonly employed in gardens and one end of a hose—such coupling being constructed so that the hose cannot assume an abrupt curve therein immediately adjacent the faucet. Without a coupling of the character I disclose, the hose adjacent the faucet is often ruptured due to the fact that the hose must be curved abruptly if the faucet is near the ground and has a downwardly projecting threaded outlet or the hose is damaged by a pull on the same causing an abrupt bend adjacent the faucet and resultant rupture.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a side elevation illustrating my improved coupling as attached between a faucet and hose.

Figure 2 is a sectional elevation of the coupling.

Referring now more particularly to the characters of reference on the drawing, the numeral 1 indicates a bibb faucet or other similar faucet used for connection with garden hoses. A coupling nut 2 is adapted to be threaded on the faucet in the usual manner. This nut 2 supports and is swivelly mounted on the body 3 of the swivel coupling. This body 3 curves downwardly and is formed at its lower end with a cylindrical vertical water passage element 4 slotted as at 5 and closed at its lower end, as shown at 6.

Adjacent the upper end of the water passage element 4 the body 3 is formed with an enlarged flange 7 circumferentially recessed at 8.

The lower end 6 of the water passage element 4 is formed with a central depending stud 9 threaded to receive a circular disc 10 of substantially the same diameter as the flange 7. This disc is circumferentially recessed on its inner face at 11 to correspond with the recess in flange 7. A lock nut 12 secures the disc 10 against unthreading movement.

A shell 13 surrounds the water passage element 4 in clearing relation and engages at its ends in the recessed portions 8 and 11. Washers or gaskets 14 in each recess make the joint watertight but allow the shell 13 to rotate about the water passage element. Proper frictional engagement of the ends of the shell 13 in the recesses is obtained by rotation of disc 10 in one direction or the other and then locking the disc in the desired position by means of nut 12.

The shell 13 is formed with a radial outlet passage 15 threaded for engagement with the female coupling nut 16 of a hose 17.

In use, the coupling is connected between the faucet as heretofore described and as shown in Figure 1 of the drawing. When so connected, the hose cannot possibly be drawn into an acute curve adjacent the faucet due to the fact that the shell 13 of the coupling will swivel about the water passage element allowing the radial outlet passage 15 to face in the direction of pull on the hose thereby eliminating any chance for the hose to "kink" adjacent the faucet.

Also, if the faucet is situated close to the ground and is of the downwardly discharging type the swivel coupling makes it possible for the hose to be connected to the source of water supply without being sharply curved from the ground up to the faucet.

The amount of curve of the body 3 of the coupling depends entirely on the curvature of the particular type of faucet the coupling is to be used with—the curve of the body being sufficient in each case to bring the water passage element to a vertical position.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A swivel hose coupling comprising a hollow body for connection to a faucet, an apertured water passage element depending from the body, an enlarged flange extending about the body adjacent the upper end of the element, a disc secured to the lower end of the element, said flange and disc having circular recesses cut in adjacent faces, a cylindrical shell surrounding the element in spaced relation thereto, the ends of said shell turnably engaging in the corresponding recesses, and a radial water passage member projecting from the shell for connection to a hose.

2. A structure as in claim 1, including means to adjust said disc axially.

JOSEPH BROADLEY.